Feb. 15, 1944.    G. J. WOREL    2,341,970

CABLE CLAMP

Filed Sept. 18, 1943

Inventor
Glen J. Worel
By Williamson & Williamson
Attorneys

Patented Feb. 15, 1944

2,341,970

UNITED STATES PATENT OFFICE 2,341,970

CABLE CLAMP

Glen J. Worel, Minneapolis, Minn., assignor to Thexton Manufacturing Company, Minneapolis, Minn., a corporation of Minnesota Application September 18, 1943, Serial No. 502,923

8 Claims. (Cl. 24—124)

This invention relates to cable clamps.

It is a general object of the invention to provide a cable clamping device wherein a deformable member is placed around the cable, and means is provided for swedging the deformable member while closely confining the same to cause it to tightly grip into the strands of a cable.

More specifically it is an object of the invention to provide an internally tapered socket which is adapted to receive a cable and a deformable gripping member in addition to a pressure device movable in the socket to force the deformable gripping member into the more restricted portion of the tapered socket and thus cause the deformable member to constrict about the cable strands.

These and other objects and advantages of the invention will more fully appear from the following description made in connection with the accompanying drawing, wherein like reference characters refer to the same parts throughout the views, and, in which.

Figure 1:
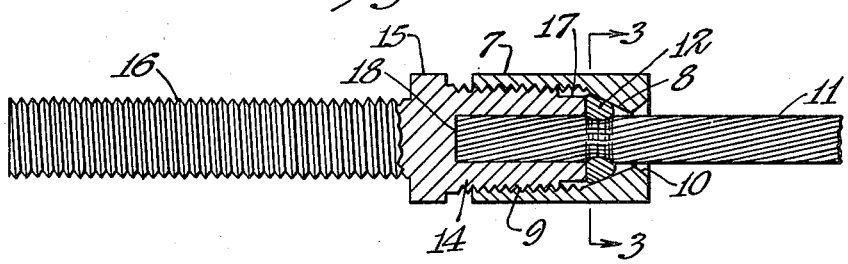
Fig. 1 is a side view of a form of cable clamp partially in longitudinal section.

In Fig. 1 there is shown an externally hexagonal socket member 7 which, as illustrated, has a longitudinal bore therethrough and a portion of said socket is provided with an internal taper 8 adjacent the right-hand end thereof. The remainder of the socket is internally threaded as at 9. From the smallest portion of the taper 8 adjacent the right-hand end of the socket 7 to the extreme end thereof there is provided an outward flare 10 to facilitate insertion of the end of a cable 11 in said socket 7.

Figure 4:
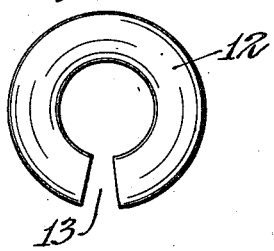
Fig. 4 is an enlarged plan view of the deformable cable gripping member shown in Fig. 1.

In Figs. 1 and 4 there is shown a deformable metal rings 12 which is provided with a split 13. The ring 12 in its normal condition before being subjected to any pressure in the cable clamp preferably has a diameter which will permit it to fit in the larger or left-hand portion of the taper 8 in the socket 7.

The left-hand end of the socket member 7 threadedly receives a plug 14 which constitutes a pressure device. The plug extends outwardly from the socket 7 and may be provided with a wrench receiving hexagonal portion 15 as well as a threaded shank 16. The right-hand or inner end of the pressure device 14 is reduced as at 17 so that when the plug is screwed into the socket 7 the reduced end 17 of the pressure device 14 can engage the deformable ring 12 and force it further into the tapered portion 8 in the socket 7. This naturally causes the deformable ring 12 to constrict about the cable 11 and tightly grip the same. As a matter of fact, the force exerted by the pressure device 14 in swedging the ring 12 into the tapered portion 8 is such that the ring which is originally round in cross section is shaped to produce a frusto-conical wall portion which naturally takes the angle of the taper 8 in the socket 7. The pressure device 14 is provided with a recess 18 which is adapted to receive the end of the cable 11.

Figure 2:
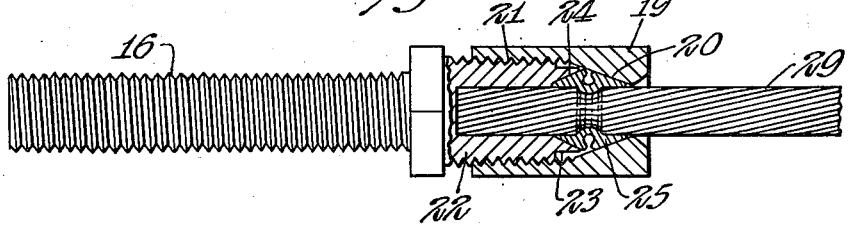
Fig. 2 is a view similar to Fig. 1 illustrating a different type of construction.

In Fig. 2 there is shown a socket member 19 provided with a taper 20 and a threaded portion 21 in the same manner as the socket 7 described above. There is also a threaded plug or pressure device 22 which is shaped similarly to the pressure device 14 except that the reduced right-hand end 23 of said pressure device is internally tapered at 24 whereas in the pressure device of Fig. 1 the right-hand end constitutes an abutment surface at right-angles to the axis of the clamp. In the pressure device 22 the right-hand end is relatively sharp due to said internal taper 24.

Figure 5:
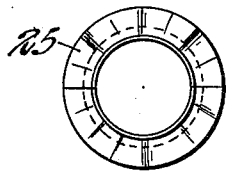
Fig. 5 is an end view of the deformable gripping member shown in Fig. 2.
Figure 6:
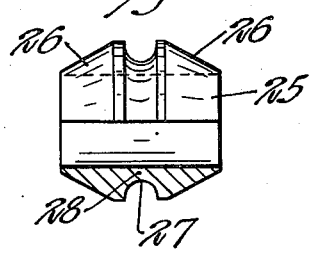
Fig. 6 is a side view partially in section of the gripping member of Figs. 2 and 5.
Figure 3:
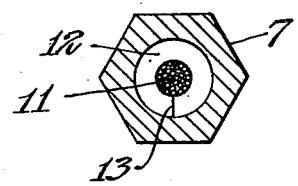
Fig. 3 is a section taken approximately on the line 3—3 of Fig. 1.

In Figs. 2, 5 and 6 there is shown a deformable gripping element 25 which is made in two pieces to facilitate placing it around a cable. As shown in Figs. 2 and 6 the gripping element 25 is provided at its ends with tapered portions 26 and at the center of the device is a groove 27 which provides a weakened central body portion 28.

As shown in Fig. 2 when the pressure device 22 is screwed into the socket member 19 the internally tapered end portion 24 of said pressure device will engage the left-hand tapered portion 26 on the gripping member 25 and press said gripping member tightly into the internally tapered portion 20 in the socket 19. Continued movement of the pressure device 22 inwardly against the gripping member 25 causes the weakened central portion 28 which extends about said gripping member 25 to bulge inwardly or constrict and tightly grip the cable 29.

From the foregoing description it will be seen that I have provided a cable clamp which is made up of a few simple parts and wherein the clamping action is produced by causing a deformable gripping member to be pressed into an internally tapered or wedge shaped socket member by means of a pressure device acting longitudinally of the socket. The socket and pressure member are threadedly interconnected and said pressure member exerts a force against the gripping member which is generally longitudinally of the clamp and is also directed generally across the threads of the socket and pressure device thus tending to keep said socket and pressure device tightly locked so that they will not separate under vibration.

It will, of course, be understood that various changes may be made in the form, details, arrangement and proportions of the various parts without departing from the scope of my invention.

What I claim is:

1. In a cable clamp, a socket member having an internally tapered portion, a constrictible and deformable cable gripping member adapted to be positioned in the tapered portion of said socket, and a pressure device movable in said socket member toward said tapered portion to engage said constrictible member and deformably swedge it inwardly in said tapered socket portion.

2. In a cable clamp, a socket member having an internally tapered portion, a constrictible and deformable cable gripping member of generally circular shape and of such size that at least a portion thereof will lie in said tapered socket portion, and a pressure device movable in said socket toward said tapered portion thereof to engage said constrictible member and deformably swedge it inwardly toward the longitudinal center of said socket.

3. In a cable clamp, a socket member having an internally tapered portion and also having an internally threaded portion adjacent said tapered portion, a constrictible and deformable cable gripping member of such size that at least a portion thereof will fit in said internally tapered portion of said socket member, and a pressure device threaded into said socket and having an inner end portion engageable with said cable gripping member.

4. In a cable clamp, a socket member having an internally tapered portion, a constrictible and deformable cable gripping member of such size that at least a portion thereof will fit into said tapered portion of said socket, and a pressure device movable in said socket member toward said tapered portion to engage said constrictible member, and said pressure device being recessed to receive the end of a cable lying with said socket.

5. In a cable clamp, a socket member having an internally tapered portion, a one piece split ring of a size to fit in said tapered socket portion, and a pressure device movable in said socket to engage said ring and constrict the latter by swedging it into said tapered socket portion.

6. In a cable clamp, a socket member having an internally tapered portion, a substantially round deformable member adapted to fit in said tapered socket portion, said deformable member having a weakened medial portion, and a pressure device movable in said socket member toward said tapered portion to engage said deformable member and force said weakened portion radially inwardly.

7. In a cable clamp, a socket member having an internally tapered portion, a deformable unit in said socket member and adapted to fit about a cable extending into said socket, said deformable unit being made of a pair of complementary substantially semi-circular elements, and a pressure device in said socket member to engage said deformable semi-circular elements and swedging them into and about a cable.

8. The structure in claim 7, and said deformable element having tapered end portions, one of which is shaped to fit in said tapered socket portion and said pressure device having an internally tapered end adapted to fit over the other of said tapered portions of said deformable unit.

GLEN J. WOREL.